(12) United States Patent
Wimberger-Friedl et al.

(10) Patent No.: US 7,349,160 B2
(45) Date of Patent: Mar. 25, 2008

(54) MULTI-LAYERED COLLIMATOR

(75) Inventors: Reinhold Wimberger-Friedl, Eindhoven (NL); Hugo Johan Cornelissen, Eindhoven (NL); Johan Gerrit De Bruin, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 322 days.

(21) Appl. No.: 10/529,668

(22) PCT Filed: Sep. 26, 2003

(86) PCT No.: PCT/IB03/04280

§ 371 (c)(1),
(2), (4) Date: Mar. 29, 2005

(87) PCT Pub. No.: WO2004/031842

PCT Pub. Date: Apr. 15, 2004

(65) Prior Publication Data

US 2007/0125971 A1   Jun. 7, 2007

(30) Foreign Application Priority Data

Oct. 1, 2002   (NL) .................................. 1021568

(51) Int. Cl.
G02B 27/30 (2006.01)
G02B 9/00 (2006.01)
(52) U.S. Cl. ...................... 359/641; 359/738
(58) Field of Classification Search ................ 359/641
See application file for complete search history.

(56) References Cited

U.S. PATENT DOCUMENTS

| 2,053,173 A | 9/1936 | Astima |
| 5,204,160 A | 4/1993 | Rouser |
| 5,462,700 A * | 10/1995 | Beeson et al. ............. 264/1.27 |
| 5,598,281 A * | 1/1997 | Zimmerman et al. .......... 349/5 |
| 6,122,465 A | 9/2000 | Arimoto et al. |

FOREIGN PATENT DOCUMENTS

WO   WO 96 40480   12/1996

* cited by examiner

*Primary Examiner*—Jordan Schwartz
*Assistant Examiner*—James C Jones

(57) ABSTRACT

A collimator for use in an optical device, such as a display device, includes a multi-layered sheet of at least five alternating light transmitting and light impervious layers. A collimation angle of a few degrees is obtainable using the collimator. The collimator may be produced by co-extruding or injection molding.

11 Claims, 8 Drawing Sheets

MULTI-LAYERED COLLIMATOR

Figure 1:
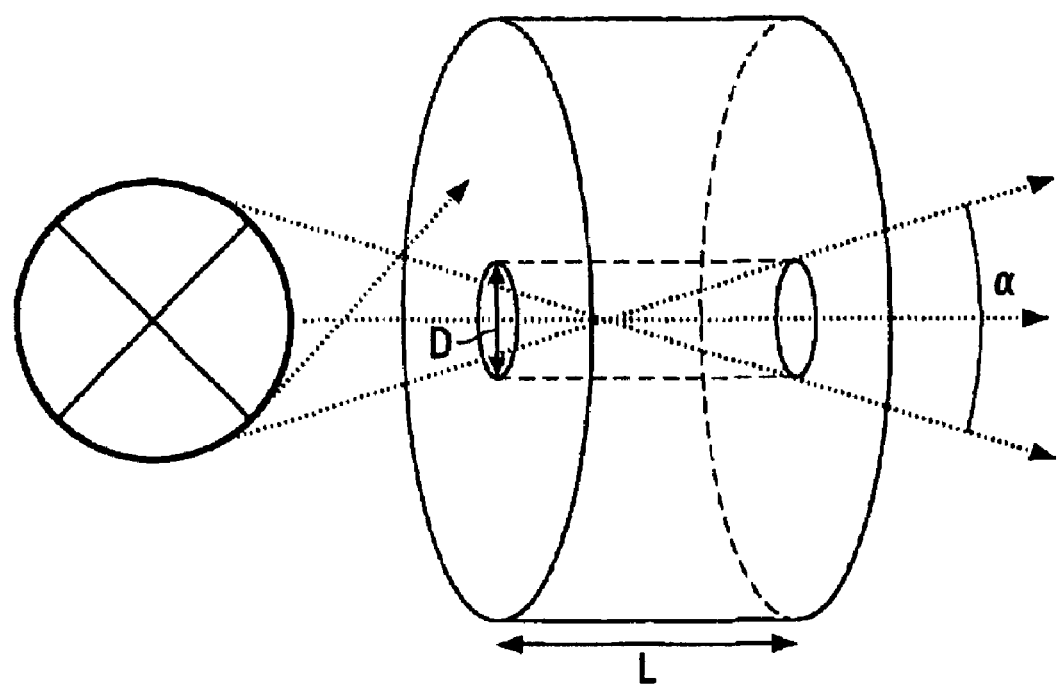

The present invention relates to a collimator for use in an optical device, such as display device, an illumination device and an optical touch sensitive device. Furthermore, the invention relates to a method for producing said collimator.

Liquid crystal displays (LCDs) are, due to their relatively low power consumption, small bulk and thin thickness, generally used as flat panel displays (FDPs) in portable computer systems, televisions, mobile phones, and other mobile electronic display devices.

LCDs control an electric field applied to a liquid crystal material of transparent organic polymers having a dielectric anisotrophy to transmit or shut off light, thereby displaying a picture or an image. LCDs use an external light source, unlike display devices that generate light internally, such as an electro-luminescent display (ELD), a cathode ray tube (CRT), a light-emitting diode (LED) and so on. LCDs are, based upon their method of utilizing light, classified in two main types: reflective and transmissive LCDs.

A reflective type LCD comprises a liquid crystal panel in which a liquid crystal material is injected between two transparent substrates and a reflector is arranged at the rear side of the liquid crystal panel or arranged at the interior of the liquid crystal panel to reflect light toward the viewing side. This reflective LCD reflects natural light or peripheral light by means of the reflector to display a picture or an image. Reflective LCDs are especially suited for outdoor use in direct sunlight. However, the contrast ratio is relatively low, compared with a transmissive display, and under poor illumination conditions, the brightness of this kind of display is low.

A transmissive type LCD comprises a liquid crystal panel having a liquid crystal material injected between two transparent substrates and a backlight unit for supplying light to the liquid crystal panel. Transmissive LCDs have a good contrast ratio, but they become practically unreadable in direct sunlight illumination conditions.

However, there also exist a third type called transflective LCDs, which may be used in both transmissive and reflective mode at the same time. The transflective LCD may be described as a reflective LCD using an auxiliary light source other than natural light. The intensity of the backlight is in the transflective LCD tuned in order to fit the lighting conditions, either by hand, or automatically, using a photo diode or the like.

A LCD device with a backlight unit often comprises two panels. One is the liquid crystal panel (LCP) itself, and the second is a light guide adapted to direct light out of its top panel surface, into and through the LCP.

However, the backlight unit does not only affect the display characteristics, but also thickness, weight and power consumption of the display device. Thus, it is desirable to develop a LCD device having an improved luminance and contrast performance and a decreased thickness, weight and power consumption.

To improve the brightness and contrast performance of the LCD, a collimator is generally used to condense the diffuse light beam generated by the light source into essentially parallel rays of light.

The light source and the collimator can either be placed at any side of a light guide (the direction of collimated light is then perpendicular to the direction of light through the LCP) or underneath the LCP (the direction of the collimated light is then the same as the direction of light through the LCP). However, for small screen sizes, the light source and the collimator is generally placed at the side of the light guide.

Collimators used in optical devices today are typically prismatic foils or funnel-shaped collimators that provide relatively large collimation angles, such as 20° or more.

However, for use in the development of future improved optical devices, such as stacked-cell type displays and optical touch sensitive devices, collimation angles of <20°, preferably of about a few degrees, is desirable.

An object of the present invention is to alleviate the above problems and to provide a collimator having a small, compact design that may be used in an optical device to provide a collimation angle within a wide range, such as from a few degrees and up to 45°, preferably <20°.

Another object of the present invention is to provide m easily performed, low-cost method for producing the collimator according to the present invention, which method enables exact tuning of collimation.

According to a first aspect of the invention, said object is achieved with a collimator for use in an optical device, which collimator comprises a multi-layered sheet of alternating light transmitting and light impervious layers.

An additional advantage of the invention is that a collimation angle below 20° is obtainable using an embodiment of the collimator according to the invention.

Another advantage of the collimator according to the invention is that an improved collimation efficiency is provided.

The collimator preferably comprises at least two light transmitting layers and at least three light impervious layers.

Said light transmitting layers are preferably made of at least one transparent amorphous polymeric material, and said light impervious layers are preferably made of at least one light absorbing and/or light scattering polymeric material, such as a polymer matrix comprising at least one type of light absorbing and/or light scattering particle or compound Preferably, each light impervious layer comprises a first section of light scattering material and a second section of light absorbing material. An advantage of such a construction is that light that falls within the acceptance angle, but not within the collimation angle, may be recycled back to the light source by the first section of light scattering material, and light of an undesired direction of propagation that reaches the second section may be absorbed by the absorbing material.

Furthermore, it is preferred that the collimator comprises projecting parts of the light transmitting layers on the side of the collimator intended to face a light source, each layer part having a lens-shaped end. Hence, the layer ends form an array of lenses which will deflect light coming at an oblique angle with respect to the normal of the layer stack, while it is neutral for any angle in the plane parallel to the stack. The efficiency of the collimator is thus further improved.

According to a second aspect of the invention, said objects are achieved with a method for producing a collimator according to the present invention, which method comprises co-extruding a melt of at least one light transmitting polymeric material and at least one light impervious polymeric material into a multi-layered sheet.

According to a third aspect of the invention, said objects are achieved with a method for producing a collimator according to the present invention, which method comprises injection molding a melt of at least one light transmitting polymeric material into layers separated by vacant spaces and connected by a common base part and filling a melt of at least one light impervious polymeric material into the vacant spaces thus providing a multi-layered sheet.

According to a fourth aspect of the invention, said collimator is comprised in a display device, an illumination device or an optical touch sensitive device.

Other features and advantages of the present invention will become apparent from the embodiment described hereinafter.

FIG. 1 schematically defines the collimation angle in a channel collimator.

Figure 2:
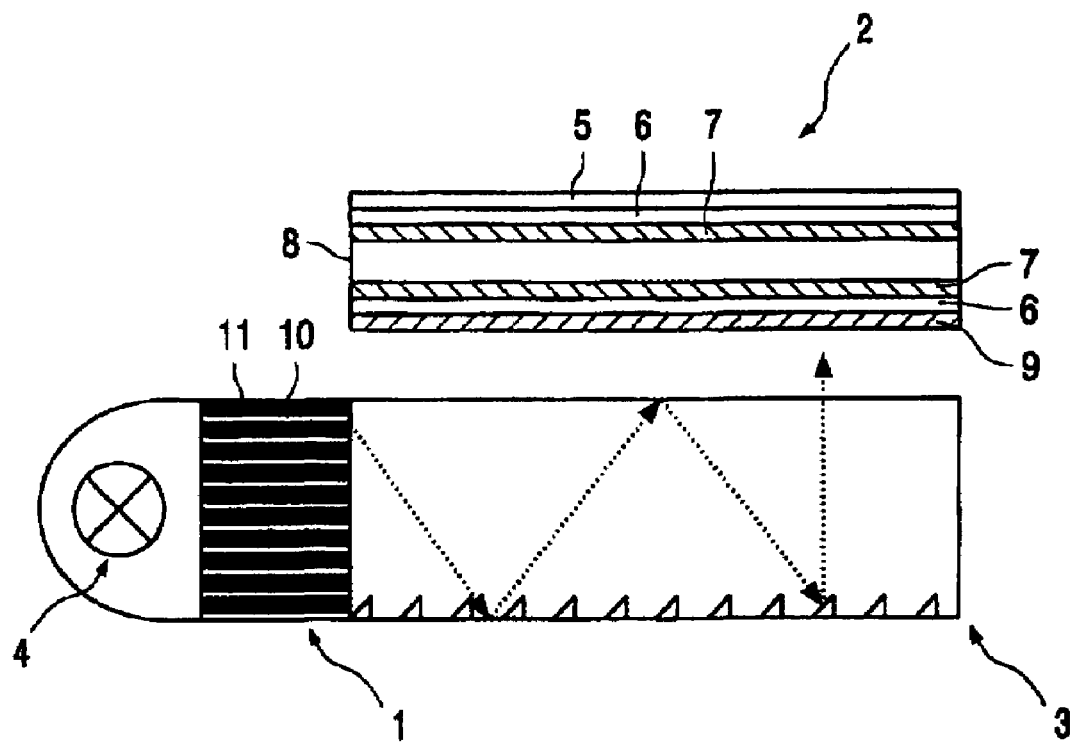

FIG. 2 schematically shows part of a transflective LCD device comprising a collimator according to an embodiment of the present invention.

FIGS. 3-6 schematically show various configurations of a collimator according the present invention and a light guide.

Figure 7:
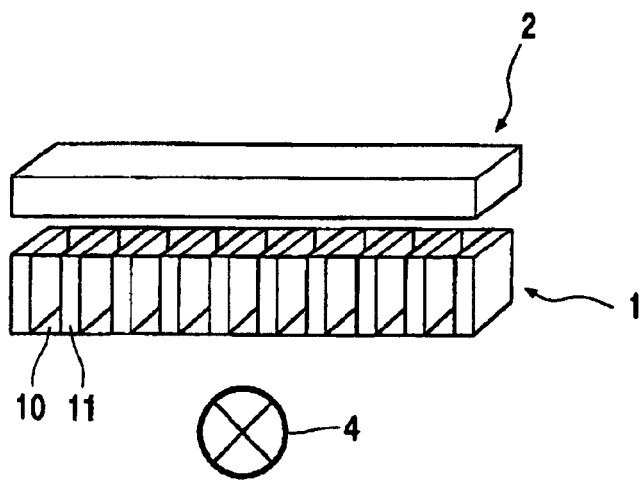

FIG. 7 schematically shows an embodiment of a collimator according the present invention placed underneath a LCP.

Figure 8:
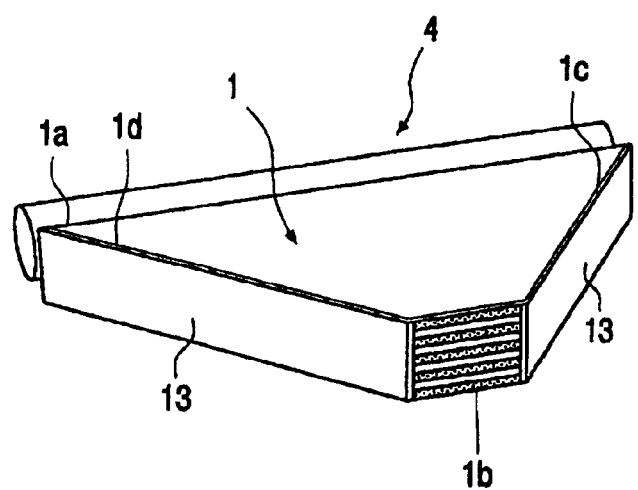

FIG. 8 schematically shows a collimator according to an embodiment of the present invention.

Figure 9:
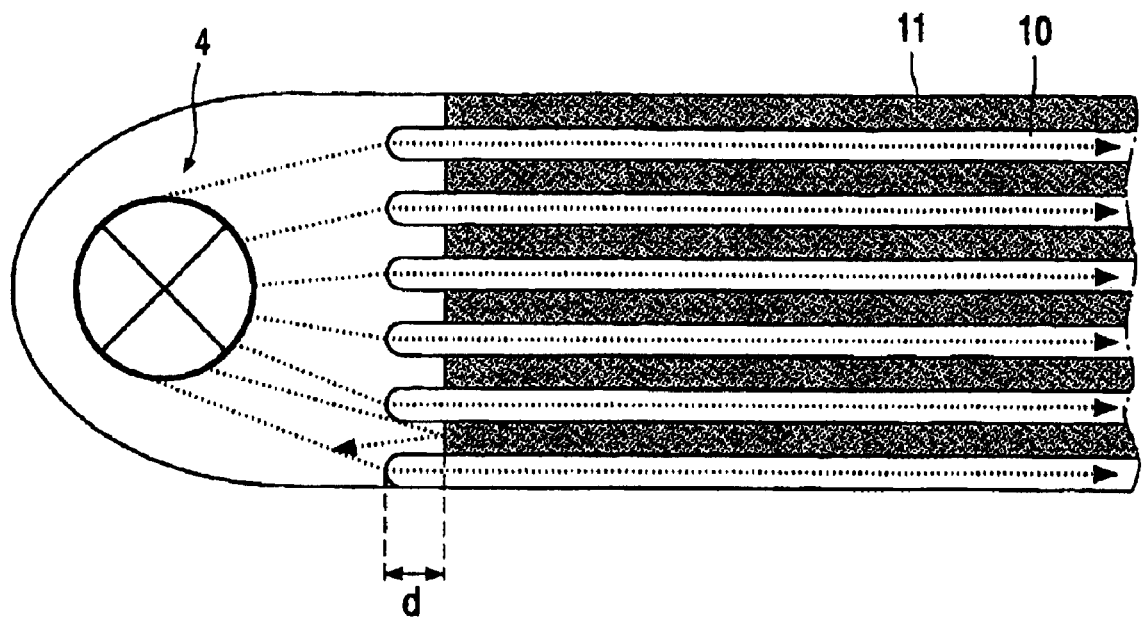

FIG. 9 schematically shows a collimator according to an embodiment of the present invention.

Figure 10:
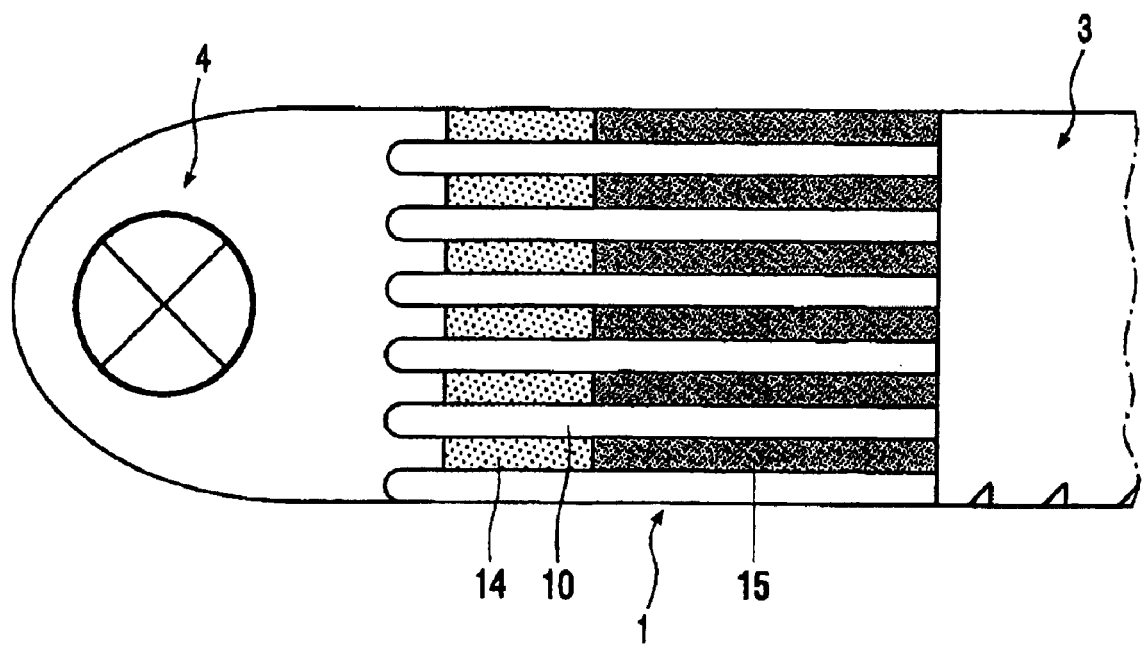
Figure 11:
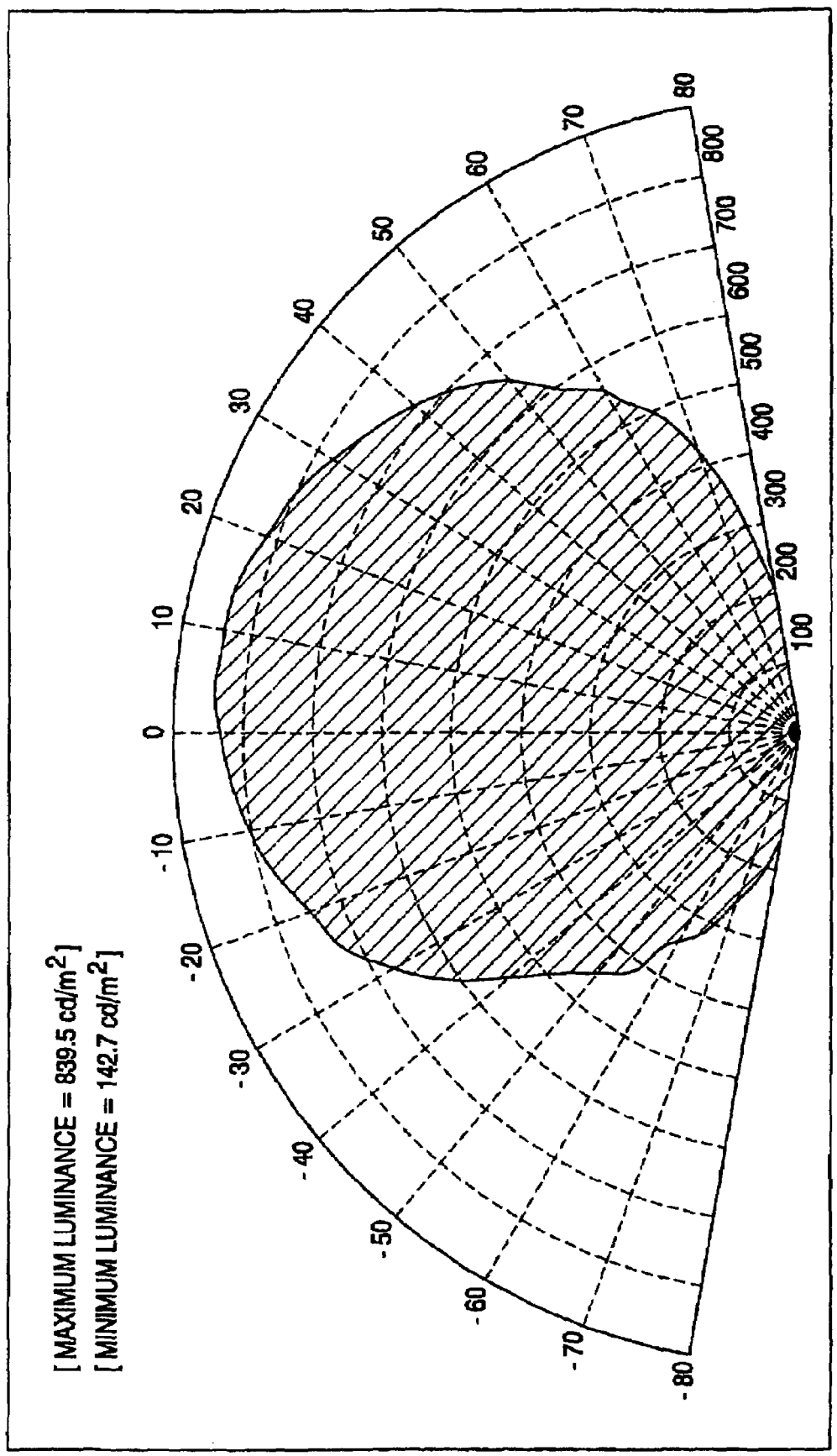
Figure 12:
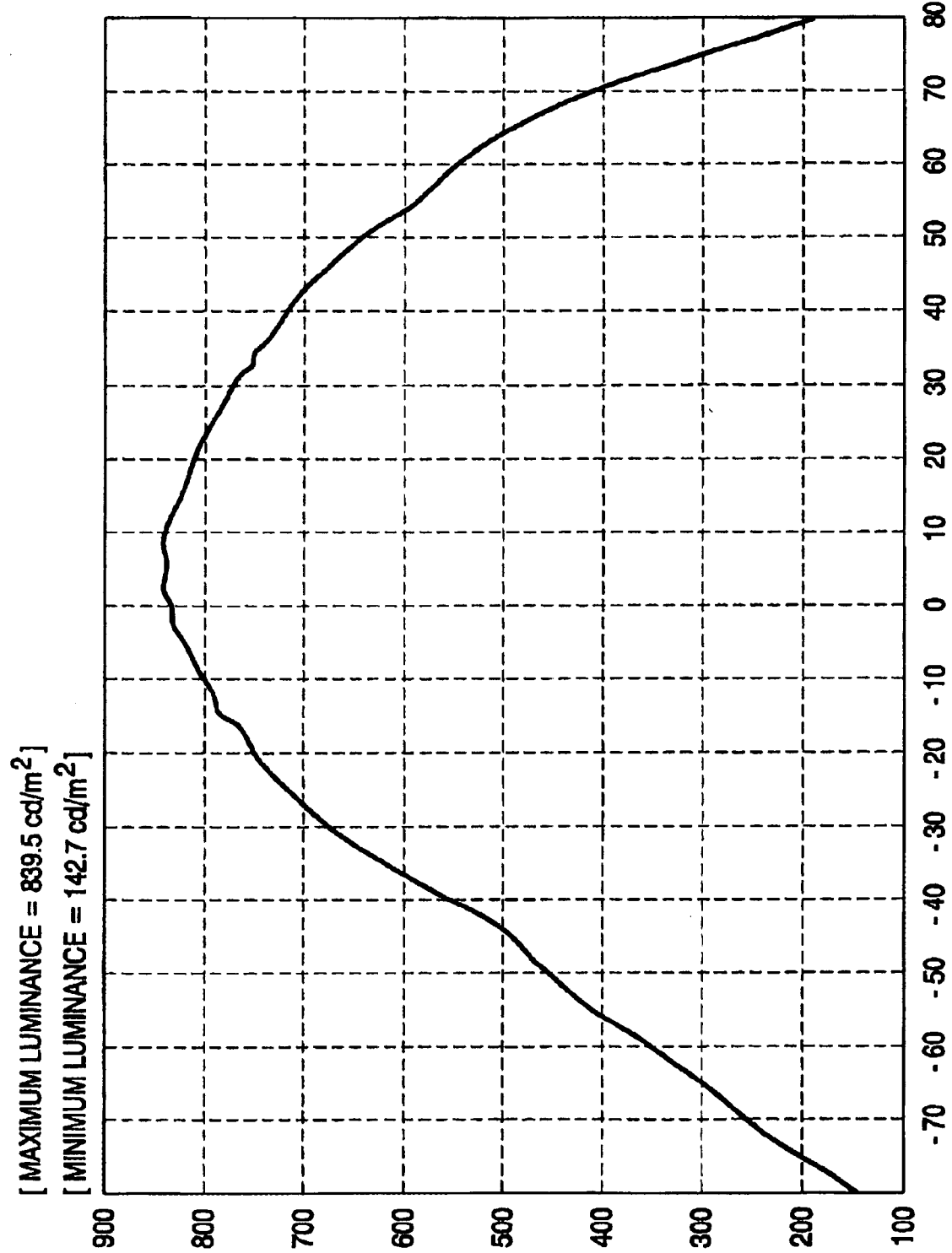

FIG. 10 schematically shows a collimator according to an embodiment of the present invention.

FIGS. 11-14 show the distribution of light intensity for light collimated using a collimator according to an embodiment of the present invention.

A way of collimating light generated by a light source is to use a light channel having a small acceptance angle which allow only transmission of light which reach into the channel. The acceptance angle, and thus the collimation angle ($\alpha$), depends solely on the ratio between the inner diameter (D) and the length (L) of the channel; $\tan \alpha = 2D/L$ (see FIG. 1). Such a device can deliver a good collimation, but at the expense of an efficiency which scales with the square of the collimation angle (for small angles). In order to increase the efficiency, such channels need to be optically separated and arranged in parallel at the closest possible distance. A two dimensional collimation of light may be provided using such a multi-channel collimator.

To collimate light in two dimensions is to make three dimensionally divergent light rays more parallel. Three dimensionally divergent non-collimated light rays will form a wide-mouthed cone with its point at a point light source. (Any light source can be thought of as a collection of point light sources.) When the cone of light rays is collimated in one dimension, a fan of light rays having the same angular volume as that of the original cone is formed. Two dimensional collimation tuns the widespread fan back into a cone-shape, but with a substantially reduced angular volume.

For a high degree of collimation in a compact device using a multi-channel collimator, the channel diameters must be very small and a lot of channels are needed. For instance, to achieve a collimation angle of 1° over a length of 2 mm, the diameter must not exceed 0.0175 mm. Consequently, the same diameter ($\leq 0.0175$ mm) is necessary to obtain a collimation angle of 2° over a length of 1 mm. However, in practice, it is very difficult, and not economically feasible, to make a collimator of an array of fibers with diameters in the micron-size range.

A part of a transflective LCD device comprising a collimator 1 according to an embodiment of the invention is shown in FIG. 2.

The transflective LCD device shown in FIG. 2 comprises a liquid crystal panel (LCP) 2, a light guide 3, said collimator 1, and a light source 4.

The light guide 3, the collimator 1, and the light source 4 constitutes the backlight unit of the LCD.

The lamp is preferably a cold cathode fluorescent lamp (CCFL) surrounded by a highly reflective foil. It shall be noted that the diameter of the lamp in practice generally is larger than the thickness of the collimator (not shown in FIG. 2 or in any other Figure).

The collimated light transmitted to the light guide 3 is reflected by the light guide 3 in a direction towards the liquid crystal panel 2.

Figure 3:
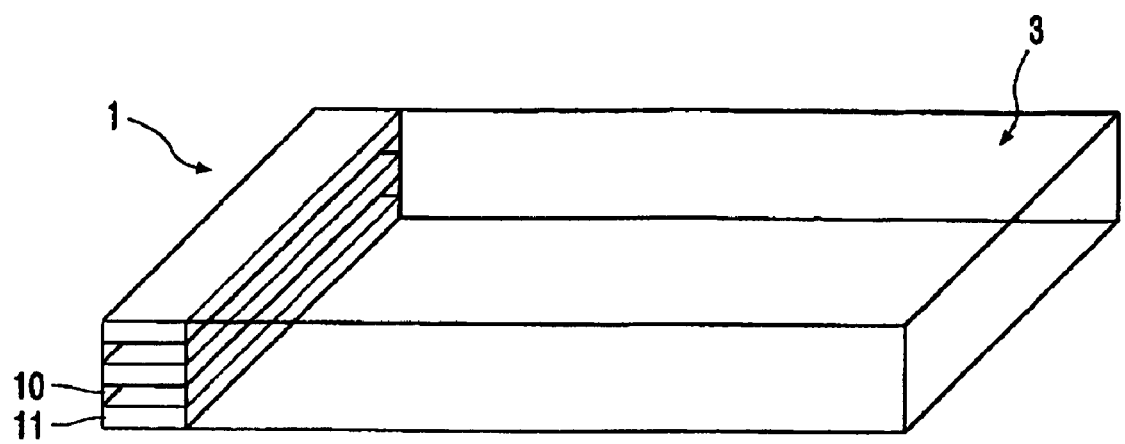

In FIG. 2, the light source 4 and the collimator 1 are place in connection to one of the short sides of the rectangular light guide 3. This type of configuration is also shown in FIG. 3. (Note: the collimator 1 shown in FIG. 3 comprises fewer layers than the collimator 1 shown in FIG. 2).

Figure 4:
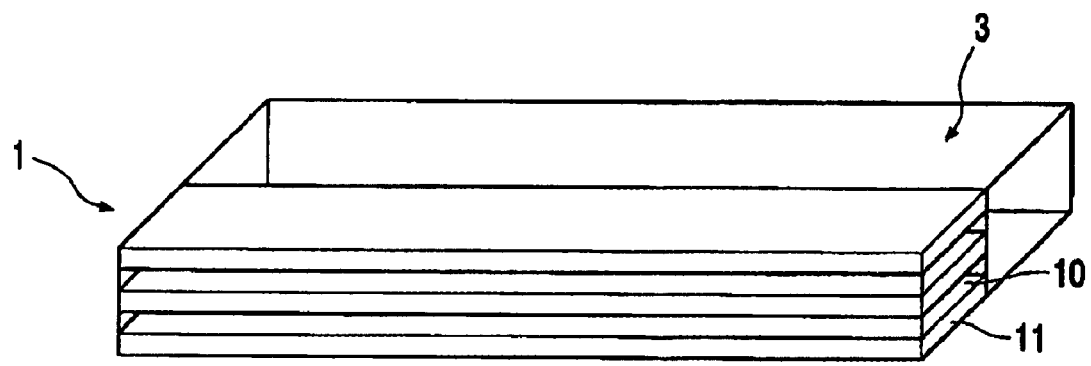

However, it shall be noted that the collimator 1 might also be placed in connection to any of the long sides of a light guide 3 constructed for such use. This type of configuration is shown in FIG. 4.

Figure 5:
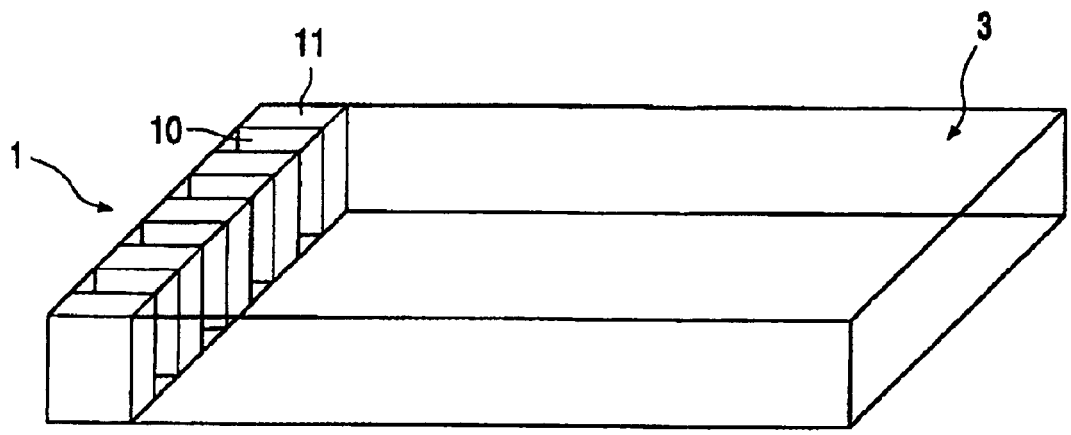
Figure 6:
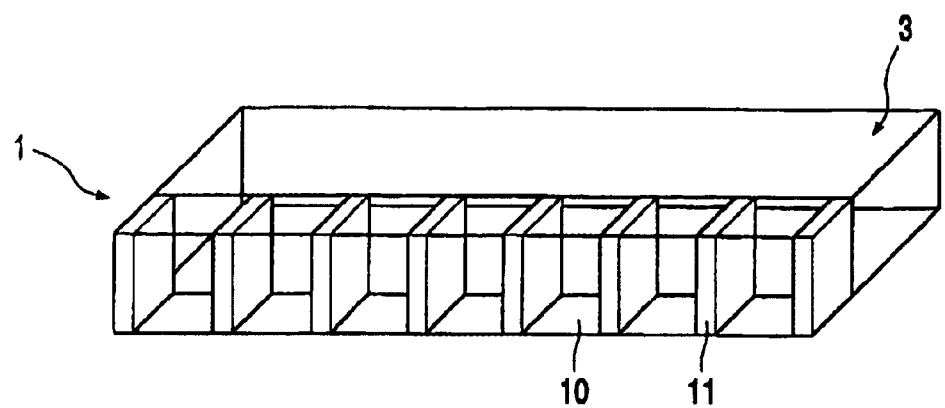

A collimator according to the invention may also comprise layers (described below), 10 and 11, oriented as disclosed in FIG. 5 and FIG. 6, respectively.

In all these embodiments shown in FIGS. 3-6 the direction of collimated light from the collimator is essentially perpendicular to the direction of light through the LCP.

A collimator according to the invention may also be designed and placed as shown in FIG. 7, i.e. the light source 4 and the collimator 1 are placed underneath the liquid crystal panel 2 (no light guide is needed). The direction of collimated light from the collimator 1 is then essentially parallel to the direction of light through the LCP 2.

The liquid crystal panel (LCP) 2 shown in FIG. 2 consists of a polarization filter 5, glass subsumes 6, electrodes 7, a liquid crystal material 8, and a transflector 9.

In a typical handheld display device, the light guide 3 is generally very thin, such as a thickness of about 1 mm.

The collimator 1 according to the present invention consist of a multi-layered sheet of alternating light transmitting layers 10 and light impervious layers 11 providing one dimensional collimation.

The light transmitting layers 10 are preferably made of a transparent amorphous polymer, such as polymethylmethacrylate (PMMA), polystyrene (PS), polycarbonate (PC), or a cyclo-olefinic co-polymer.

The light transmitting layers 10 transmit light of a predetermined propagation direction, thus providing light having a predetermined collimation angle.

Other propagation directions are absorbed and/or partially reflected towards the light source 4.

The light impervious layers 11 are preferably made of a light absorbing and/or light scattering (crystalline) polymer, or a polymer matrix comprising at least one type of light absorbing and/or light scattering particle, such as particles of titanium dioxide, or compound, such as an absorbing dye. The light impervious layers 11 may, however, also be made of, for instance, a light absorbing polymer matrix comprising light scattering particles distributed throughout the matrix.

The collimator 1 according to the present invention preferably comprises at least five alternating layers 10 and 11, i.e. two light transmitting layers 10 covered by three light impervious layers 11. Thus, a collimator displaying an excellent collimation efficiency is provided.

As used herein the term "collimation efficiency" means the amount of light generated by the light source which is transmitted through the collimator, thus providing light with a certain collimation angle (predetermined propagation direction).

The dimensions of the alternating light transmitting and light impervious layer in the collimator according to the invention provides a collimation angle ($\alpha$) according to the above described formula $\tan \alpha = 2D/L$.

The thickness of each light transmitting layer 10 (corresponds to D of the channel shown in FIG. 1) is preferably within the range of from 25 to 250 μm.

The thickness of each light impervious layer 11 is preferably within the range of from 2.5 to 25 μm.

The lateral extension of each alternating layer 10 and 11 (the lateral extension of each light transmitting layer 10 corresponds to L of the channel shown in FIG. 1), respectively, is preferably within the range of from 0.5 to 10 mm.

The lateral extension of the alternating layers 10 and 11 corresponds to the distance that light generated by the light source 4 will be transmitted in the collimator 1 to reach the light guide 3.

The longitudinal extension of the alternating layers 10 and 11 corresponds to the sides of the layers 10 and 11 facing the light source 4, and the light guide 3, respectively. Thus, the longitudinal extension of the alternating layers 10 and 11 is adjusted to the size of the light source 4 and the size of the light guide 3.

Both the thickness and the lateral extension of the layers affect the degree of collimation (the collimation angle), as disclosed above, and thus the overall transmission of light.

The ratio between the lateral extension (L) and the thickness (D) of each light transmitting layer is preferably $\geq 2$, more preferably $\geq 5$, even more preferably $\geq 20$, and most preferably $\geq 50$.

Thus, a collimation angle preferably within the range of from 0.3 to 45°, more preferably from 0.3 to 20°, even more preferably from 0.3 to 5°, most preferably from 0.3 to 2°, is obtainable using a collimator according to the invention having the above disclosed layer dimensions.

The collimator according to the present invention can be produced by stacking individual layers of a light transmitting material alternated with individual layers of a light impervious material.

An alternative method of producing the collimator according to the present invention is by coating layers of a light transmitting material with a light impervious material, and thereafter laminating the coated layers to a stack.

Still another method for producing the collimator according to the present invention is by using injection molding technique.

The method according to the invention comprises injection molding a melt of at least one light transmitting polymeric material into layers separated by vacant spaces and connected by a common base part, and filling a melt of at least one light impervious polymeric material into the vacant spaces thus providing a multi-layered sheet.

As disclosed above, the light transmitting layers are molded on a non-layered base part of light transmitting material. This light transmitting base part may be directly attached to the light guide, thus forming part thereof. Alternatively, the base part is removed by machining to produce a collimator having a smaller dimension.

The injection molding method makes it possible to produce a collimator comprising individual layers of at least two sections of different light impervious materials. A material displaying strongly light scattering behavior may constitute a first section starting at the side of the collimator facing the light source, and a light absorbing material may constitute a second section ending at the side of the collimator facing the light guide. Thus, light that falls within the acceptance angle, but not within the collimation angle, may be recycled back to the light source by the first section of light scattering material. Light of an undesired direction of propagation that reaches the second section is absorbed by the absorbing material The present invention also relates to an co-extrusion method for producing a collimator according to the present invention by sequential layer multiplication.

By using this method, a collimator comprising very thin layers, such as a few micrometers, is easily and inexpensively produced. However, the method is not limited to the production of thin layers, but may also be used for producing a collimator comprising thicker layers.

The method according to the invention comprises co-extruding a melt of at least one light transmit polymeric material and at least one light impervious polymeric material into a multi-layered sheet.

Sequential layer multiplication by co-extrusion is used in other technical fields for the production of multi-layered sheets.

Sequential layer multiplication is preferably performed by single step continuous melt excision using a multiplication device. This procedure involves the formation of a double-layer by co-extrusion. The double-layer is then cut into two double-layers and one of the double layers is squeezed on top of the other. The cutting and squeezing are thereafter repeated optional number of times to form a multi-layered sheet of alternating light transmitting and light impervious layers.

Using this method according to the invention, a collimator comprising very thin layers can be manufactured. The number of layers does not affect the manufacturing cost.

The ratio with regard to layer thickness between the light transmitting polymeric material and the light impervious polymeric material can be adjusted over a broad range via the feed rate to the extrusion channel.

When a sheet having the desired numbers of layers has been made, using any of the above disclosed methods, the sheet is cut to desired dimensions.

The cut surfaces of the sheet is then treated to obtain desired optical properties and to provide said collimator. Typically, the cut surfaces pointing towards the light source and towards the light guide are machined to optical smoothness. The other two cut surfaces are preferably covered by reflective layers in order to increase the light output.

The collimator can be utilized for amplification of light from a light source 4 with larger lateral dimension than the illuminated light guide (not shown). The collimator 1 has then preferably a shape as shown in FIG. 8. The cut surfaces 1a and 1b pointing towards the light source 4 and towards the light guide (not shown), respectively, are optically smooth and reflective layers 13 of aluminum are provided on the other two cut surfaces 1c and 1d of the sheet.

However, the cut surfaces which in FIG. 8 are covered with reflective layers 13 may instead be covered with absorbing layers.

Surface relief structures, such as prisms, may also be applied on at least one of the surfaces of he multi-layered sheet.

The efficiency of the collimator can be further increased by increasing the acceptance angle without decreasing the collimation quality. This can be obtained by forming the ends of the layers of the light transmitting polymeric material facing the light source into lenses. Such a collimator comprises projecting parts of the light transmitting layers from one side of the sheet, said parts having a convex end shape.

Consequently, the method according to the present invention preferably further comprises removing some of the light impervious polymeric material from one treated cut surface of the sheet thereby leaving parts of light transmitting polymeric material projecting from the sheet.

The light impervious polymeric material is preferably removed to a depth (d) equal to the layer thickness (see FIG. 9).

This is preferably performed by using a light transmitting polymeric material and a light impervious polymeric material having different solubility properties. The light impervious polymeric material is then preferably removed by immersing the treated cut surface in a solvent which dissolves the light impervious polymeric material near the cut surface. The light transmitting polymeric material projecting from the sheet is thereafter heated to round it off and form layer ends having lens shapes. Upon heating, the light transmitting polymeric material will be rounded off due to the surface tension of the polymeric material. These lens-shaped layer ends of light transmitting polymeric material is then arranged to face the light source 4 as shown in FIG. 9. This array of lenses will deflect light coming at an oblique angle with respect to the normal of the layer stack, while it is neutral for any angle in the plane parallel to the stack The light impervious polymeric material may also advantageously be removed using plasma etching or any other suitable technique as know to skilled persons in the art.

Removal of light impervious polymeric material using any of the methods disclosed above also enables the above described collimator comprising individual layers of at least two sections of different light impervious materials to be produced by other methods than the above injection molding method.

Thus, a sheet comprising alternating light transmitting and light impervious layers is made using, for instance, the above disclosed co-extrusion method.

The light impervious layers can be made from either a material displaying strongly light scattering behavior or from a light absorbing material.

Parts of the light impervious material, preferably light absorbing material, is then removed to a desirable depth using any of those methods disclosed above, and another type of light impervious material, preferably light scattering material, is filled in the spaces thus provided.

Thus, using this method a collimator, as shown in FIG. 10, comprising light impervious layers having a first section 14 of light scattering material starting at the side of the collimator 1 facing the light source 4, and a second section 15 of light absorbing material ending at the side of the collimator 1 facing the light guide 3. The light that falls within the acceptance angle, but not within the collimation angle, may be recycled back to the light source 4 by the first section 14 of light scattering material. Light of an undesired direction of propagation that reaches the second section 15 is absorbed by the absorbing material.

The invention will now be further illustrated by means of the following non-limiting examples.

EXAMPLE 1

A collimator according to the invention was manufactured as described above with the co-extrusion method according to the invention.

A sheet comprising 128 alternating light transmitting layers and light impervious layers was made.

The light transmitting layers (64) were made of polymethylmethacrylate and each layer had a thickness of 20 μm.

The light impervious layers (64) were made of a polycarbonate matrix containing 5 vol % titanium dioxide particles (particle size 2 μm). Each light impervious layer had a thickness of 5 μm.

Thus, the total thickness of the sheet was 1.6 mm

The lateral extension of the sheet was 1 mm.

The longitudinal extension of the sheet was 20 mm. The collimation angle was 2.3°.

EXAMPLE 2

A collimator according to the invention was manufactured as described above with the co-extrusion method according to the invention.

A sheet comprising 16 alternating light transmitting layers and light scattering layers was made.

The light transmitting layers (8) were made of polymethylmethacrylate and each layer had a thickness of 200 μm.

The light scattering layers (8) were made of a polycarbonate matrix containing 5 vol % titanium dioxide particles (particle size 2 μm). Each light scattering layer had a thickness of 50 μm.

Thus, the total thickness of the sheet was 2.0 mm.

The lateral extension of the sheet was 1.5 mm.

The longitudinal extension of the sheet was 40 mm.

The nominal collimation angle was 15°.

The set-up shown in FIG. 2 was used in this example.

The light source was a cold cathode fluorescent lamp with a diameter of 2.6 mm and surrounded by a high reflective (about 98-99%) foil to redirect all emitted and reflected light towards the collimator. The lamp was operated at a high frequency alternating current of 5 mA.

The distribution of light intensity was measured for light collimated using this collimator. FIGS. 11-14 show the distribution of light intensity both for light in a horizontal (FIGS. 11 and 12) and in a vertical (FIGS. 13 and 14) cross section.

Light emitted from the light source has a wide angular spread which corresponds to the light distribution measured in the horizontal cross-section.

Figure 13:
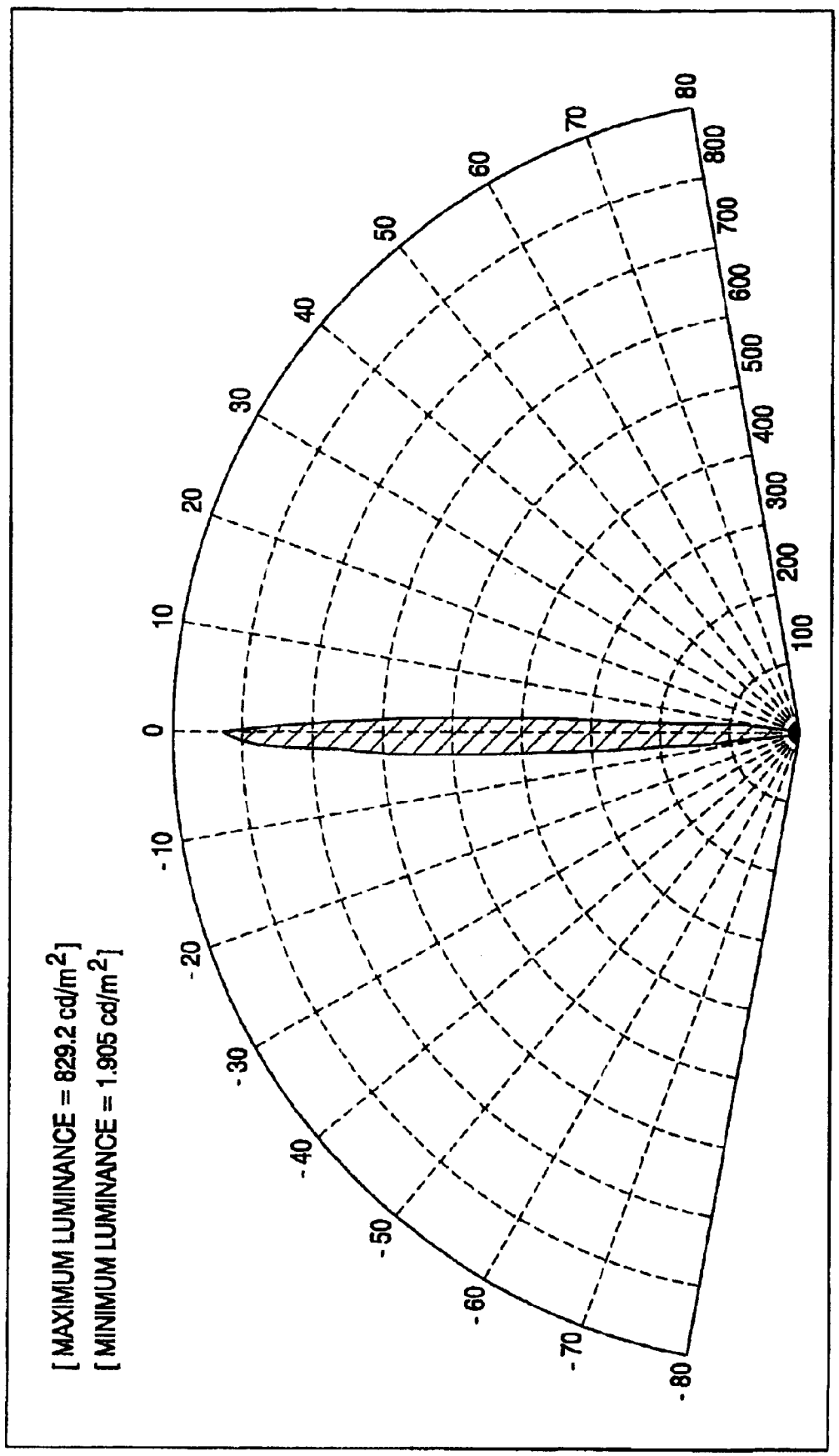
Figure 14:
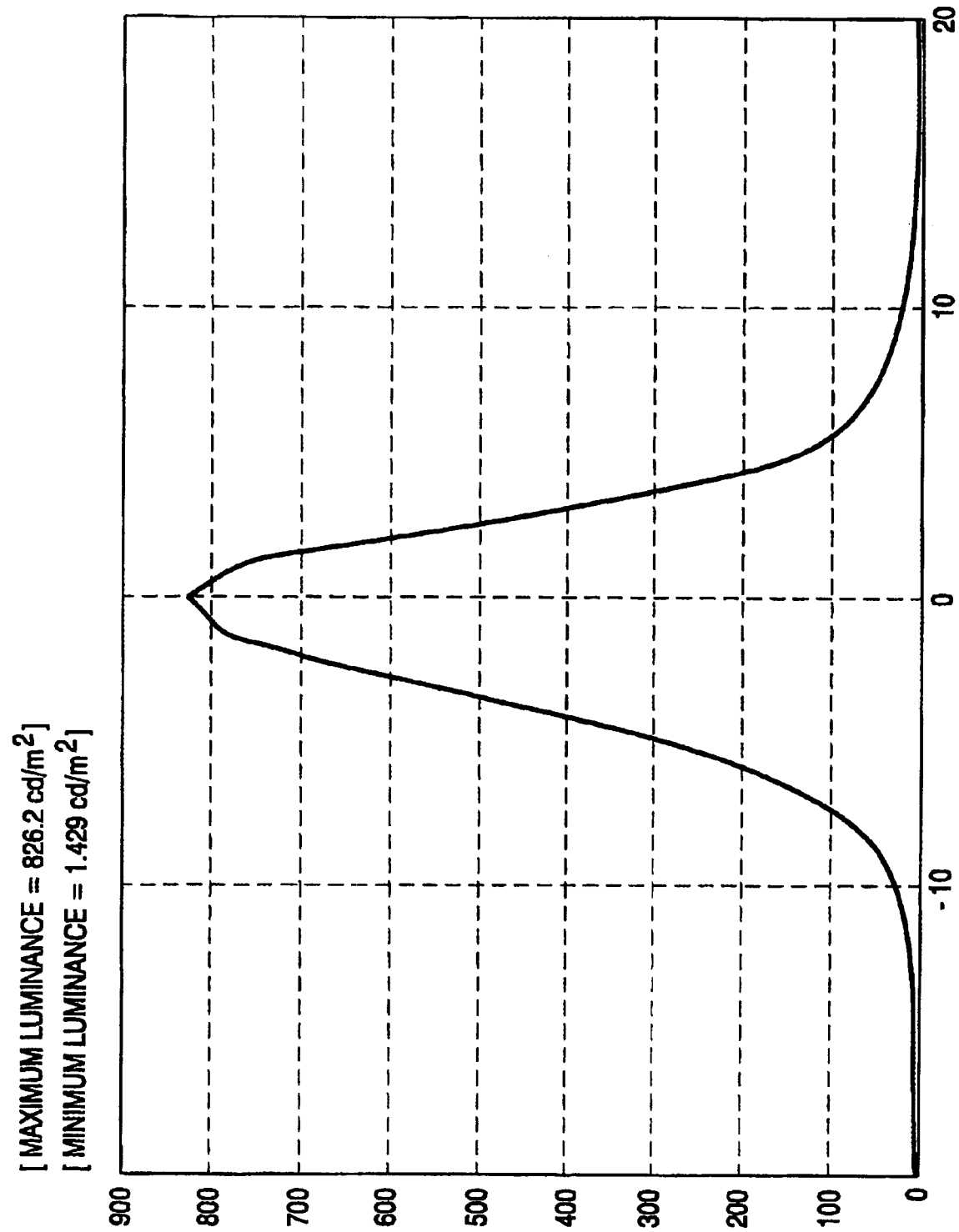

The vertical cross-section comprises collimated light. FIGS. 13 and 14 show the distribution of light intensity versus collimation angle. It can be seen in FIGS. 13 and 14 that a very high collimation efficiency at a low collimation angle, <20°, is provided.

The maximum luminance was measured to be about 825-840 cd/m$^2$. The luminance in the vertical cross-section was very low (below 100 cd/m$^2$) for a collimation angle larger than 13°, as shown in FIG. 14.

Thus, as shown in the Examples, the collimator according to the invention provides a collimation angle of <20°, such as about a few degrees, and an improved collimation efficiency.

As disclosed above, the collimator according to the invention may be comprised in any optical device in need of collimated light. Examples of optical devices in which the collimator according to the invention advantageously may be used are display devices, illumination devices and optical touch sensitive devices.

Furthermore, the methods for producing a collimator according to the invention are easily performed and relatively inexpensive as compared to prior art methods.

Moreover, these methods enable production of a collimator with exact tuning of the collimation angle.

While the invention has been described in detail and with reference to specific embodiments thereof, it will be apparent for one skilled in the art that various changes and modifications can be made therein without departing from the spirit and scope thereof.

The invention claimed is:

1. A collimator for use in an optical device comprising a multi-layered sheet of alternating light transmitting and light impervious layers, wherein each light impervious layer comprises a first section of light scattering material and a second section of light absorbing material.

2. The collimator according to claim 1, wherein said multi-layered sheet comprises at least two light transmitting layers and at least three light impervious layers.

3. The collimator according to claim 1, wherein the light transmitting layers are made of at least one transparent amorphous polymeric material.

4. The collimator according to claim 1, wherein the light impervious layers are made of at least one light absorbing and/or light scattering polymeric material.

5. The collimator according to claim 1, wherein the light impervious layers are made of a polymer matrix comprising at least one type of light absorbing and/or light scattering particle or compound.

6. The collimator according to claim 1, which comprises projecting parts of the light transmitting layers on a side of the collimator intended to face a light source, each layer part having a lens-shaped end.

7. A method for producing a collimator comprising a multi-layered sheet of alternating light transmitting and light impervious layers, the method comprising the act of co-extruding a melt of at least one light transmitting polymeric material and at least one light impervious polymeric material into a multi-layered sheet.

8. A method for producing a collimator comprising a multi-layered sheet of alternating light transmitting and light impervious layers, the method comprising the acts of:
  injection molding a melt of at least one light transmitting polymeric material into layers separated by vacant spaces and connected by a common base part, and
  filling a melt of at least one light impervious polymeric material into the vacant spaces thus providing a multi-layered sheet.

9. A display device comprising a collimator according to claim 1.

10. An illumination device comprising a collimator according to claim 1.

11. An optical touch sensitive device comprising a collimator according to claim 1.

* * * * *